United States Patent Office 2,927,569
Patented Mar. 8, 1960

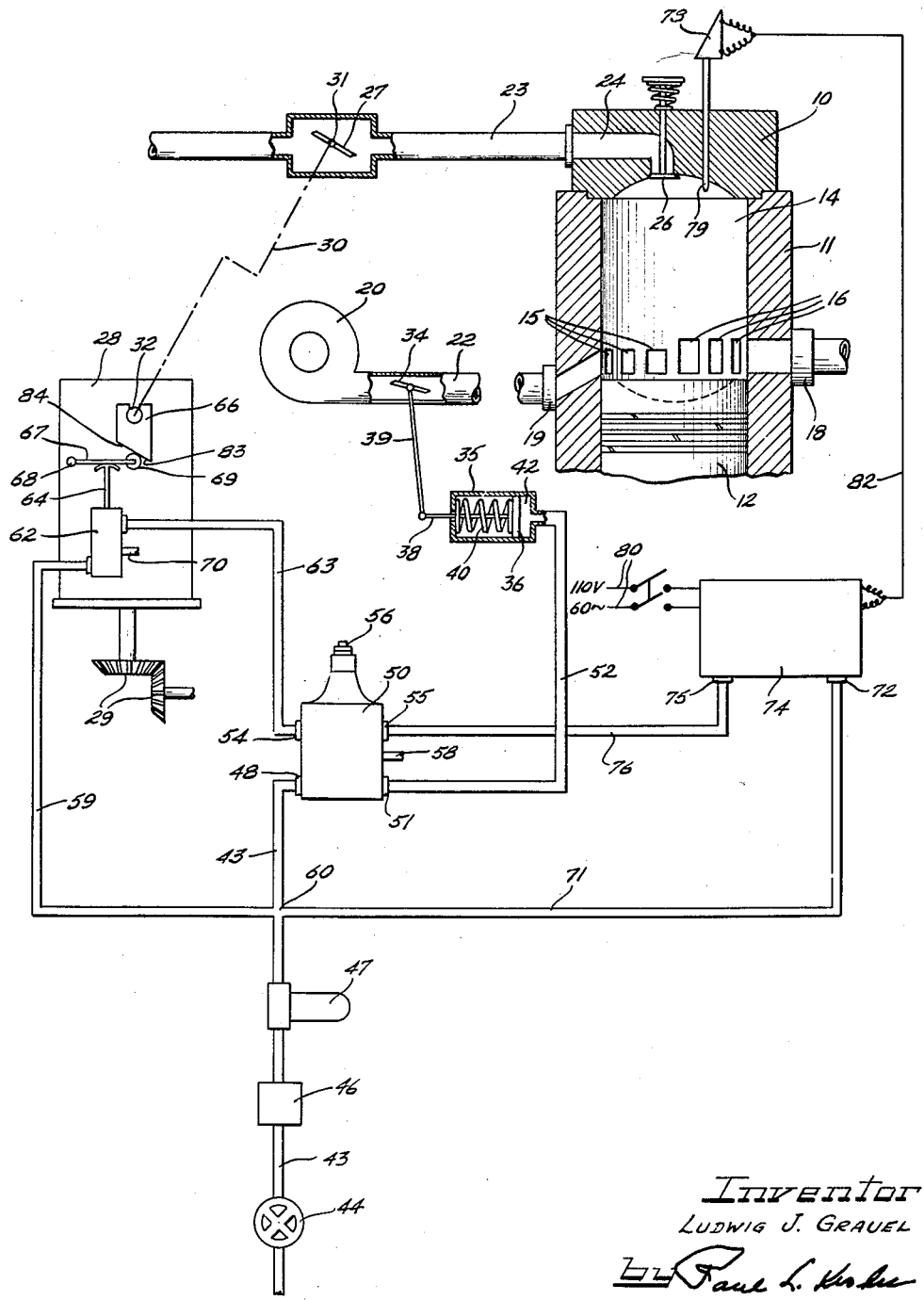

2,927,569

ENGINE AIR SUPPLY CONTROL

Ludwig J. Grauel, Beloit, Wis., assignor to Fairbanks, Morse & Co., Chicago, Ill., a corporation of Illinois Application August 4, 1958, Serial No. 752,901

5 Claims. (Cl. 123—120)

This invention relates to improvements in internal combustion engines, and has particular reference to an improved method of, and control system for, controlling and regulating engine supply of combustion air such as to secure improved fuel combustion with attendant increase in engine operating efficiency.

As is well known in the internal combustion engine art, the attainment of practical optimum fuel combustion is dependent in great part, upon the relative proportions of fuel and air in the engine cylinders. Proper proportioning of air to fuel, while important in engines operating on oil fuel, is of particular importance to effective and efficient engine operation on gas fuels, as methane and butane for example, due to the critical ignition and burning characteristics of such fuels. The supply of air in material excess of the volume required for effective combustion of a given volume of gas fuel, results in lean mixtures usually difficult to ignite and which undergo incomplete combustion with consequent loss of engine power output. On the other hand, among the disadvantages of an insufficient supply of air are fuel detonation and, again, incomplete gas fuel combustion. Moreover, in effecting proper proportioning of air supply to the fuel in cylinder supply, such proportioning must also account for the B.t.u. heat characteristic of the particular fuel employed, and such factors as the temperature, the moisture content and the density of the combustion air.

Accordingly, the primary object of the present invention is to afford engine supply of combustion air in controlled volume or quantity such as will assure effective fuel combustion under all operating conditions of the engine.

Another object is to afford combustion air control in an internal combustion engine, through regulation of the volumetric rate of combustion air delivery to the engine as a function, jointly, of fuel quantity delivery and the temperature in the engine combustion space.

A further object is to provide a fluid-pressure operated control system for regulating combustion air supply to the engine, adapted and arranged for response to variations in fuel delivery to the engine and variations in engine combustion space temperature.

The foregoing and other objects and advantages of the present invention will appear from the following description of a presently preferred mode and system of combustion air control, as such is illustrated by the accompanying drawing the single figure of which presents the preferred system in diagrammatic or schematic form.

The present invention is suitable for application to single or multicylinder engines generally, adapted for operation on one or more fuels, as selectively for example, on oil fuel or on suitable gas fuel. However and for the reasons hereinbefore noted, it is especially advantageous in connection with engines operating on gas fuels, as methane, butane and the like. Accordingly, the present mode and system of combustion air control is herein described by way of example, in association with a gas engine.

With reference to the schematic showing in the drawing, a gas engine cylinder assembly is illustrated in fragmentary part as including a cylinder head 10, cylinder 11 and piston 12 reciprocable therein, these parts defining the cylinder combustion space 14. In the present example, the cylinder 11 is provided with piston-controlled air ports 15 and exhaust ports 16, the latter leading to an exhaust discharge manifold indicated at 18. The air ports 15 communicate with air supply manifold indicated at 19, the manifold being supplied with scavenging and combustion air under pressure from a suitable blower or compressor 20, through supply conduit 22. Although not here shown, the compressor 20 may be driven from the associated engine, or separately driven as desired.

Engine supply of gas fuel from a suitable source (not shown), is effected through conduit 23 communicating with a passage 24 in cylinder head 10, such passage opening to the cylinder combustion space 14 under control of a suitable intake valve 26. In conduit 23 is a gas throttle valve 27 for regulating gas fuel quantity delivery to the engine. The throttle valve is operated by an engine driven governor 28 of suitable type, the operating connection being indicated by the broken line 30 between the valve shaft 31 and the output member or shaft 32 of the governor. Engine drive of the governor may be effected as through the gearing indicated at 29. For fuel ignition, suitable ignition means such as a spark plug or the like (not shown) is provided in the cylinder assembly.

As is usual in engines according to the present example, the normal operating capacity of the compressor is such that, without volumetric delivery control, the air supplied to the engine over its operating range is in excess of requirements for optimum fuel combustion. Therefore, and since the fuel-air ratio is important and generally critical to ignition and combustion of gas fuel in the combustion space, control of the volumetric rate of combustion air delivery to the engine is here afforded in an improved and effective manner now to be described.

Operatively mounted in the air conduit 22 is an air throttle valve 34 for regulating, according to its throttling position therein, the volumetric rate of pressure air supply from the compressor 20 to the air manifold, and hence to the air ports 15 of the cylinder for admission to the combustion space 14. Positional operation of valve 34 is by a fluid-pressure operated servomotor 35 providing a piston 36 having its rod 38 connected by link 39 to the valve. The piston is normally urged or biased in one direction by a spring 40, the bias direction here being such as to produce opening displacement of the valve, as toward and to a desired terminal open position which may be determined by a valve stop (not shown). Valve displacement in the closing direction is the result of fluid pressure admitted to the servomotor cylinder 42 and acting to displace the piston 36 in opposition to spring 40, with the extent of piston movement and, hence, of valve closing, variable in dependence upon the pressure of fluid applied to the servomotor.

Pressure fluid for servomotor operation may be provided, advantageously, from the usual engine starting air source (not shown) over an air supply conduit line 43 having therein a manual shut-off valve 44, a pressure reducer device 46 and an air filter 47. Line 43 leads to the input 48 of a regulatable control or pressure reducer device 50, the output 51 of which is connected by a conduit line 52 to the servomotor cylinder 42. The device 50 is a fluid-pressure or pneumatic force-balancing instrument wherein the pressure of the controlled fluid at the output 51 is at all times in balance with the resultant of the combined pressure of two regulating pressure fluids and an adjustably settable spring bias. In the device, the inputs for the regulating pressure fluids are at 54 and 55, while the setting adjustment for the spring bias is indicated at 56. The servomotor line 52 is vented through the device, as by vent 58, upon reduction in fluid-pressure in such line. Instruments such as the device 50 are well known and available upon the open market, and are manufactured by Moore Products Co. and others.

In the present example, the fluid source for such regulating pressure fluids in application to device 50, is the air supply line 43. A branch conduit line 59 leads from a junction 60 in line 43 between the filter 47 and device 50, to the input of a pressure reducer controller 62 having its output connected by conduit line 63 to the regulating pressure input 54 of device 50. Controller 62 also is a well known and readily available device which operates in accordance with positionment of its control element 64, to determine the pressure of fluid in its output line 63. Actuation of the control element 64 is here effected through the engine governor 28, as by a suitable cam 66 on governor shaft 32 acting on the element 64 through a lever 67. The controller preferably is disposed in mounted position adjacent the governor or thereon, while the lever 67 may be pivotally carried on the governor case, as at 68. Lever 67 may be provided with a cam-follower roller 69 in engagement with cam 66, as shown. Also and for venting line 63 upon controller decrease of fluid-pressure therein, the controller includes the vent 70 for such purpose.

Another branch conduit line 71 extends from junction 60 to the input 72 of a controller unit 74 which has its fluid-pressure output 75 connected by a conduit line 76 to the regulating pressure input 55 of device 50. The unit 74 is of a character to determine the fluid-pressure at its output 75 in accordance with a given variable condition, as temperature in this instance, and is well known and readily available for the purpose. It is here made responsive to a thermosensitive device 78 of suitable well known electrical type, mounted on the engine cylinder head 10 with its thermocouple sensing element 79 exposed to the combustion space 14. The controller unit 74 energized from a power source indicated by the 110 volt, 60 cycle conductors 80, is connected with the device 78 by the electrical cable 82.

In the present control system example, the pressure reducer 46 is set to reduce the compressed air supply (which for engine starting purposes, is usually under supply pressure of about 250 p.s.i.g.) to a pressure of, say, 125 p.s.i.g. in the lines 43, 59 and 71. Thus the control instruments 50, 62 and 74 have the same air input pressure (125 p.s.i.g.), and each is selected as to its pressure-reducing range from such input pressure, to attain a desired output range presently to appear. Considering first the controller 62 in its operated association with the governor cam 66, the cam is set on governor shaft 32 to have an initial effective position in the engine no-load condition of the governor (a condition determining substantial closure of the gas throttle valve 27, hence minimum gas-quantity delivery to the engine sufficient to maintain engine operation at no-load). In such initial effective position, the low end portion 83 of the inclined and preferably planar cam face 84 of cam 66 engages the lever roller 69, thereby depressing element 64 and adjusting the controller to determine a desired maximum air pressure of 60 p.s.i.g. in line 63 to the control device 50. Now, upon governor response under-engine loading to open the gas valve 27, as up to full-open position at full engine load, the cam 66 turning counter-clockwise as viewed in the drawing, will cause corresponding rise of the element 64 (due to upward bias thereon as provided in the controller) with consequent adjustments of the controller to determine decreased air pressure in line 63, to a value substantially 30 p.s.i.g. at cam position corresponding to full-open position of the gas valve 27. Thus the controller 62 is here operable to produce control pressures in line 63 variable between pressure values of 30 to 60 p.s.i.g. Moreover and as will now appear, such controller determined pressure increases with governor operation of the gas valve 27 in the closing direction, and vice versa, hence attaining pressure variations in line 63 in inverse relation to variations in gas-quantity supply to the engine.

Respecting the controller unit 74, the operation of this unit is such as to produce at its output 75 and, hence, in line 76 to the device 50, control air pressures variable between about 5 p.s.i.g. and 60 p.s.i.g. consequent to variations in engine combustion space temperature as sensed by the thermosensitive device 78—79. At relatively low combustion space temperature, as obtains under engine idling, no-load operation, the controller 74 responds to determine the air pressure in line 76 at the value of 60 p.s.i.g. With increase in combustion space temperature up to temperatures obtaining under full-load engine operation, the controller reduces the pressure in line 76 down to a minimum pressure of about 5 p.s.i.g. Thus, the pressure in line 76 varies inversely with temperature variations in the engine combustion space.

Turning now to the control device 50, this device is selected for response to the control force which is the resultant of the sum of the control air pressures admitted from lines 63 and 76 minus the force of the bias in the device (adjustably settable through means 56 as hereinbefore noted), to produce from the 125 p.s.i.g. air pressure admitted at the device input 48, an output air pressure in line 52 equal to such control force. For the purpose of the present example, the bias force in device 50 is set through means 56, to equal 30 p.s.i.g. (such bias may be and usually is in such control devices, an adjustable spring). Consequently, it will be observed that with maximum input control pressures of 60 p.s.i.g. in the lines 63 and 76, the resultant control force of unit 50 will be 90 p.s.i.g. (60+60—30), while with maximum control pressures of 30 p.s.i.g. in line 63 and 5 p.s.i.g. in line 76, such resultant will be 5 p.s.i.g. (30+5—30). Thus the output pressure range of device 50 is here 5 to 90 p.s.i.g. Moreover, the servomotor 35 is adapted for response to such pressure range in its operating function relative to the air valve 34, such that with 5 p.s.i.g. air pressure on the servomotor piston 36, the latter will be positioned under its spring bias to dispose the air valve 34 substantially at its terminal open position. With increase of air pressure in line 52, up to the maximum 90 p.s.i.g., the piston will be correspondingly displaced against the spring bias, to effect corresponding closure of the air valve, to its closed position (which, practically, is a predetermined minimum open position as may be set by an adjustable stop, not shown).

Referring now to the operation of the combustion air control system as described, assume first that the engine is started and running under normal idle, no-load conditions wherein the governor sets the gas valve 27 for minimum or idling fuel supply to the engine. The controller 62 then will be governor-cam adjusted to provide about 60 p.s.i.g. control pressure in line 63 to device 50, while the controller unit 74 in response to the then comparatively low combustion space temperature, produces air pressure in lines 76 to the device 50, at or near 60 p.s.i.g. The device 50 thus effects approximately 90 p.s.i.g. air pressure in line 52, acting to operate the servomotor 35 to dispose the air valve in or near its minimum open position for reducing the volumetric rate of combustion air delivery to the engine to the minimum value required for efficient gas fuel combustion under the idle, no-load condition of the engine. It is important to note here that the combustion space temperature reflects by variations thereof (other than variations due to the cyclic fuel intake, combustion, exhaust and scavenging phases of engine operation), variation in temperature, barometric pressure and moisture content of the ambient air in supply to the blower or compressor 20, as well as any variation in the B.t.u. content of the gas fuel in engine supply. Thus, with change in any or all of these factors the thermosensitive unit 78—79 will respond to any resultant temperature increase, for example to cause corresponding output pressure adjusting operation of the controller unit 74. In such instance, the controller unit will variably reduce the air pressure in line 76 proportionately with increased combustion space temperature, with resultant corresponding reduction in the control force of device 50 and consequent corresponding reduction in air pressure in line 52 to the servomotor 35. The latter then operates to move the air valve in the opening direction from its minimum open position, to a corresponding extent, whereby to establish the volumetric rate of combustion air delivery at an optimum rate required for efficient fuel combustion under the factors noted.

Under full-load operation of the engine, the governor effects full-open position of the gas throttle valve 27 for maximum gas fuel delivery, and coincidentally through cam 66 conditions the controller 62 to determine the air pressure in line 63 at 30 p.s.i.g. At the same time, the controller unit 73 will be conditioned in response to the action of the thermosensitive unit 78—79 reflecting the full-load combustion space temperature condition, to effect air pressure in line 76 at or near 5 p.s.i.g. The control device 50, therefore, operates to produce a minimum or near-minimum air pressure, as 5 p.s.i.g., in line 52 to the servomotor, with resultant action of the latter to position the air valve in or near its terminal open position establishing combustion air delivery to the engine at the volumetric rate required for optimum fuel combustion at full-load. Here again, any variations in temperature, barometric pressure and moisture content of the ambient air supply to the compressor 20, and variations in B.t.u. content of the gas fuel to the engine, will be accounted for through the controller unit 74, in like manner as hereinbefore described.

At loads less than full-load on the engine, the present combustion air control system will function in the manner above described, to position the air valve 34 intermediate its minimum and terminal open positions, for optimum air supply under the then existing loading of the engine.

It is to be understood that while the present invention is here shown and described in application to a gas engine of the character indicated, it may be advantageously utilized with engines operating on liquid fuel, as oil, and with engines operating on two or more different fuels, as dual-fuel engines operable selectively with oil or gas fuel.

Having now described and illustrated one example of the invention, it will be now appreciated that various modifications may be made therein without departing from the spirit and scope of the invention as hereinafter claimed.

What is claimed is:

1. The method of controlling combustion air delivery to the combustion space of an internal combustion engine having variable fuel-quantity delivery to the combustion space, which comprises producing a control force varying in force value with variations of fuel-quantity delivery, continuously sensing combustion space temperature, producing a second control force varying in force value with sensed variations of combustion space temperature, and regulating the volumetric rate of combustion air delivery as a function of the sum of the control forces.

2. The method of controlling combustion air delivery to the combustion space of an internal combustion engine having variable fuel-quantity delivery to the combustion space and including combustion air supply means providing an air valve positionable for determining the volumetric rate of combustion air delivery, which comprises producing a first control force varying in force value with variations of fuel-quantity delivery, continuously sensing combustion space temperature, providing a second control force varying in force value with sensed variations of combustion space temperature, producing a third variable control force wherein the force value thereof is proportional to the sum of the force values of the first and second control forces, and determining the position of said air valve by the third control force.

3. In combination with an internal combustion engine having variable fuel supply means and combustion air supply means including a conduit for combustion air delivery to the engine combustion space, a valve in the conduit positionable therein for determining the volumetric rate of combustion air delivery, means sensing combustion space temperature continuously during engine operation, first regulator means controlled by said variable fuel supply means, second regulator means controlled by said means sensing combustion space temperature, and means controlled jointly by said first and second regulator means, for positioning said valve.

4. In an internal combustion engine having means including a conduit for the delivery of combustion air to the engine combustion space, and variable fuel supply means including an engine operated governor, the combination therewith of a valve in the conduit positionable therein for determining the volumetric rate of combustion air delivery, a fluid-pressure operated servomotor for positioning said valve, a delivery connection from a fluid-pressure source to the servomotor including an adjustable pressure reducer for determining the pressure of fluid in delivery to the servomotor, thermosensitive means sensing engine combustion space temperature continuously during engine operation, and separate means individual to and controlled by said governor and said thermosensitive means, jointly effective on said pressure reducer for causing adjustments thereof.

5. In an internal combustion engine having means including a conduit for the delivery of combustion air to the engine combustion space, and variable fuel supply means including an engine operated governor, the combination therewith of a valve in the conduit positionable therein for determining the volumetric rate of combustion air delivery, a fluid-pressure operated servomotor for positioning said valve, means providing a single source of pressure fluid, a delivery connection from said source to the servomotor including a pressure reducer regulatable for determining the pressure of fluid delivery to the servomotor, said pressure reducer being regulatable by and in accordance with pressure variations of regulating pressure fluid supplied thereto, a first connection between said source and said pressure reducer for supplying regulating pressure fluid to the latter, means in said first connection and controlled by said governor for varying in accordance with variations in governor operation, the pressure of the regulating pressure fluid supplied to the pressure reducer, a second connection between said source and said pressure reducer for supplying additional regulating pressure fluid to the latter, thermosensitive means sensing engine combustion space temperature continuously during engine operation, and means in said second connection responsive to said thermosensitive means for varying in accordance with variations in engine combustion space temperature, the pressure of said additional regulating pressure fluid supplied to the pressure reducer.

References Cited in the file of this patent

UNITED STATES PATENTS

| | | |
|---|---|---|
| 2,392,060 | Osborn | Jan. 1, 1946 |
| 2,438,663 | Greenland | Mar. 30, 1948 |
| 2,780,211 | Davids | Feb. 5, 1957 |
| 2,841,129 | Reggio | July 1, 1958 |